Patented Oct. 23, 1945

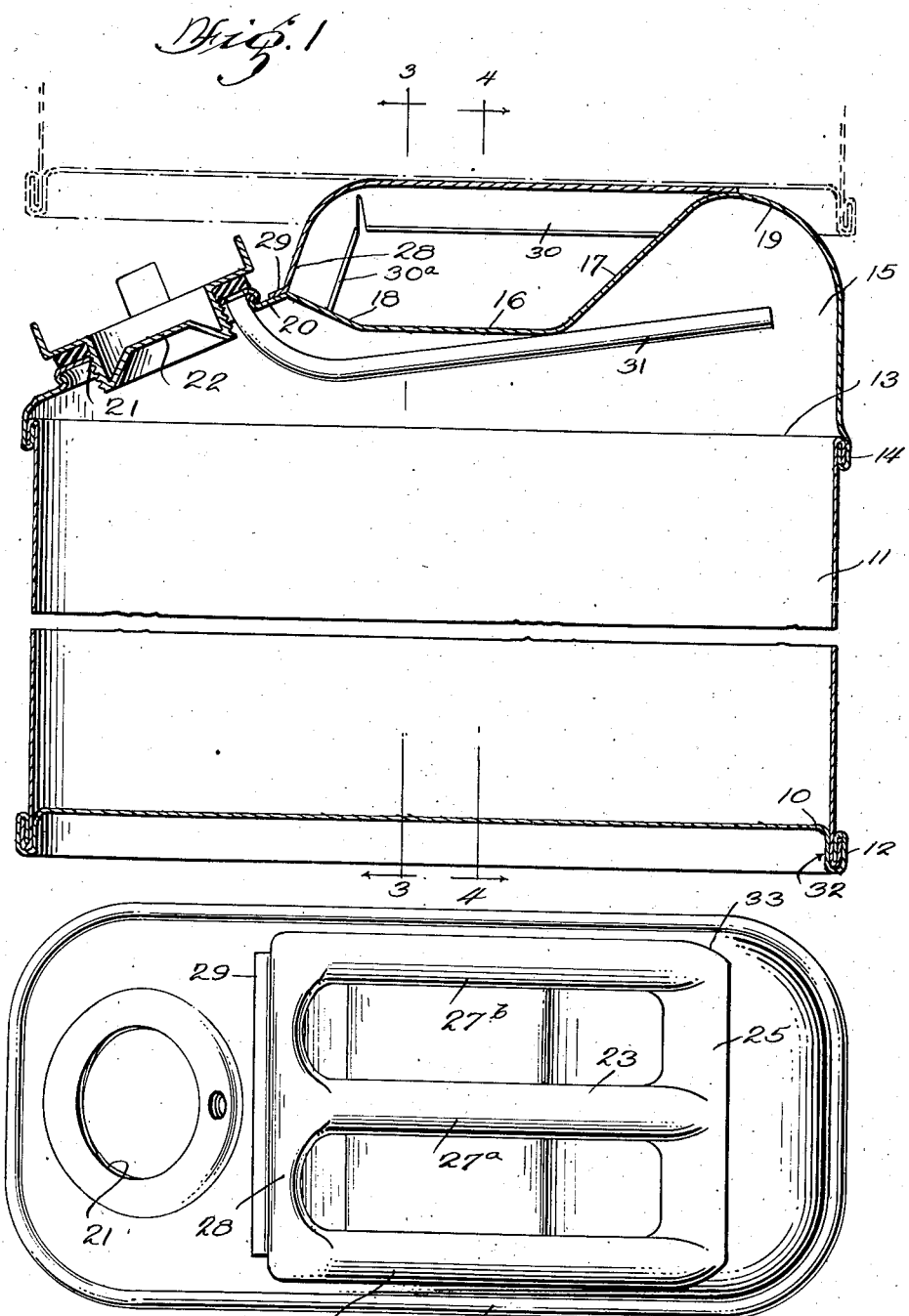

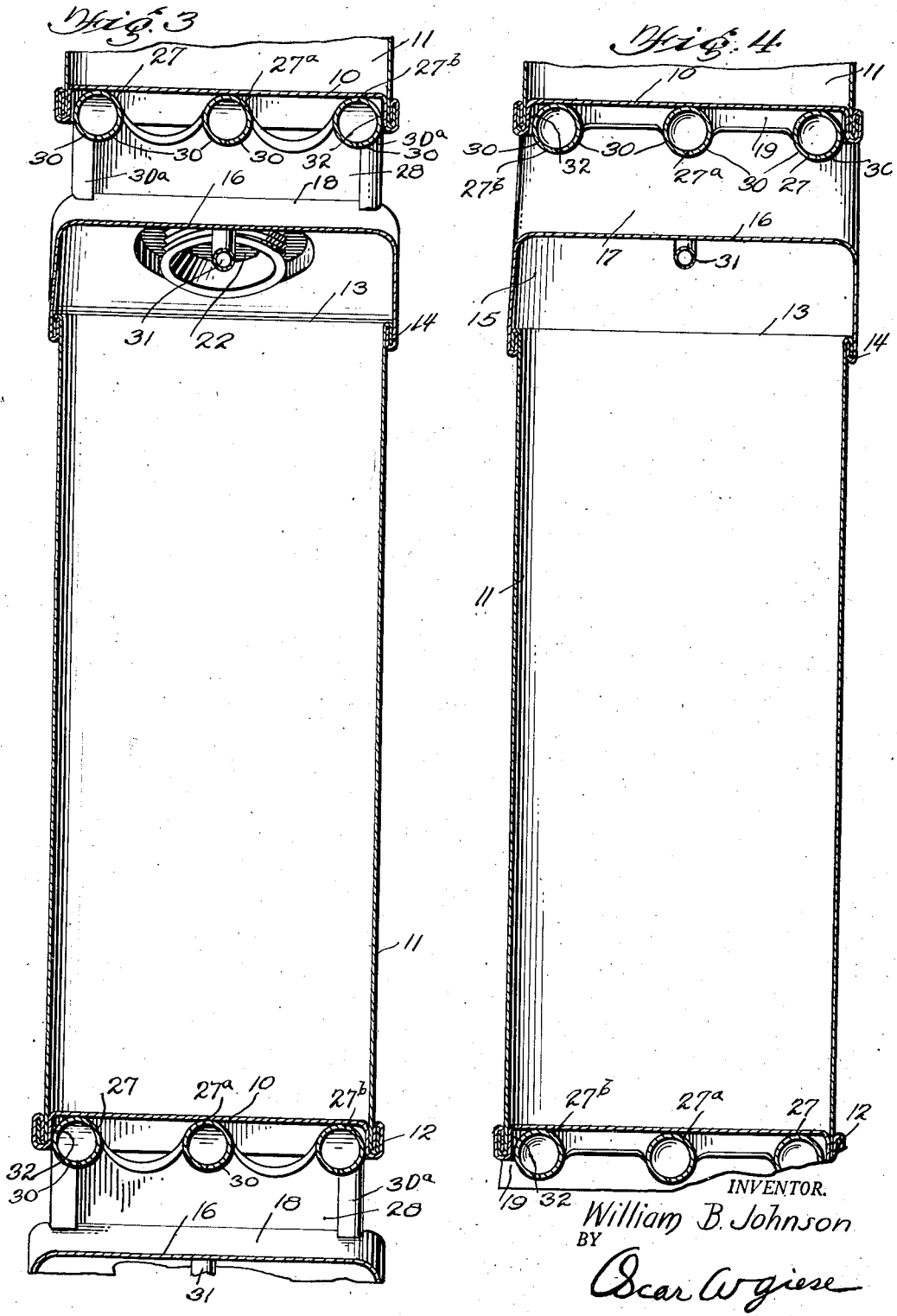

2,387,270

UNITED STATES PATENT OFFICE 2,387,270

CONTAINER

William B. Johnson, United States Army, Easley, S. C.

Application July 7, 1944, Serial No. 543,934

4 Claims. (Cl. 220—97)

(Granted under the act of March 3, 1883, as amended April 30, 1928; 370 O. G. 757)

The invention described herein, if patented may be manufactured and used by or for the Government for governmental purposes, without the payment to me of any royalty thereon.

The present invention relates to containers and more particularly to a sheet metal container or can adapted for storage and transportation of gasoline or other motor fuels, this application being a continuation in part of my co-pending application, Serial Number 412,975, filed September 30, 1941.

In modern military operations, it has been found unsatisfactory to attempt to refuel mechanized equipment such as aircraft, tanks, motorcycles or reconnaissance vehicles by the use of large tanks, because under conditions of actual combat it is often difficult or impossible to transport such tanks from place to place in the field, especially when undertaking shore landings from naval vessels or in crossing rivers, lakes or other bodies of water.

It is now believed that the most satisfactory method of fueling such vehicles under conditions of actual combat is to employ a large number of comparatively small sheet metal containers of a capacity of say, for example, five gallons each, because of the ease with which these small containers may be transported, concealed, or handled during refueling operations.

Containers of this character should be constructed and arranged to occupy the minimum space for the maximum contents, and also permit expeditious and convenient storage. These containers should also be constructed and arranged to permit one container to be stacked upon another in closely nested relation.

In operations, including crossing rivers or streams, the fuel containers are carried in small, heavily-loaded trailers coupled to the rear of motor vehicles, and it is not unusual for the trailer to be overturned or for the containers to be thrown into the stream accidentally. Furthermore, it has always been recognized as highly desirable that all equipment used in such maneuvers be arranged to float, in order that under emergency conditions the different units of equipment may be individually and separately floated across the stream or drawn across on the surface of the water by a cable or rope.

It is, therefore, an object of the present invention to provide an improved fuel container whereby military vehicles may be supplied with fuel from a plurality of comparatively small light containers which may be conveniently transported in the field.

Another object of the invention is to provide an improved fuel container which is constructed and arranged to occupy the minimum space commensurate with the quantity of their contents and which may be stacked one upon another.

A further object of the invention is to provide a compact fuel container which has handle members formed on its upper portion, these handles being constructed and arranged to permit the container to be carried in balanced condition by one person or by two persons, the handles also providing a support for superimposed container, whereby a plurality of containers may be arranged in nested or stacked relations.

A further object of the invention is to provide an improved fuel oil container having a base and lifting handles which are so constructed and arranged as to normally maintain the container in vertical position whether supported by the base or supported by the handles, the base and handles being of such shape as to engage and cooperate with each other to prevent displacement of the containers when they are stacked one above the other, as in storage or in transit.

It is also an object of this invention to provide a fuel container of generally improved construction, whereby the device will be simple, durable, and inexpensive in construction, as well as convenient, practical, serviceable and efficient in its use.

With the foregoing and other objects in view, which will appear as the description proceeds, the invention resides in the combination and arrangement of parts and in the details of construction herein described and claimed, it being understood that various changes in form, proportion and minor details of construction may be made within the scope of the claims without departing from the spirit or sacrificing any advantages of the invention.

For a complete disclosure of the invention, a detailed description thereof will now be given in connection with the drawings forming a part of the specification:

Figure 1 is a vertical sectional view of the improved container, a second container being shown in dotted lines in stacked relation upon the container;

Figure 2 is a plan view of the container; and

Figure 3 is a vertical transverse sectional view taken on the line 3—3 of Figure 1, depicting a second container in stacking relation upon the container; and Figure 4 is a similar view taken on the line 4—4 of Figure 3.

Referring to the drawings, in which corresponding parts are indicated by similar reference characters, 10 indicates a flat bottom member of generally rectangular shape with rounded corners, and this bottom member is united with side walls 11 by a reinforcing rolled edge or bead 12 extending completely around the bottom. A top member 13 is similarly secured to the upper edge of the side wall 11 by a reinforcing rolled edge or bead 14, which also extends completely around the top and unites the top with the side wall 11 to form the container body.

The top 13 is preferably formed of sheet metal arranged to provide a chamber or air trap 15 within the container and which extends substantially above the upper flat surface 16 which is united with the upper wall of the air trap or chamber 15 by an inclined wall 17. The flat top wall 16 has an upturned portion 18 which is united with an inclined wall or shelf 20 that extends downwardly from the upturned portion 18 to the reinforcing bead 14.

A threaded aperture 21 is formed in the inclined wall 20, and a threaded closure plug at 22 is adapted to be screwed into the threaded aperture to seal the container against the entrance of extraneous matter and to prevent the contents of the container from being spilled therefrom when the closure plug is in closed position. The contents of the container may be readily directed into the container through the threaded aperture 21 by simply removing the screw plug 22.

To facilitate the handling of the container, a handle structure 23 is provided which is formed of sheet material having an upper terminal flange or strip 25 which conforms with and is secured to top wall 19 of the container air trap 15 and the upper terminal of the inclined wall 17. The opposed terminal of the handle structure 23 is provided with a downturned plate or extension 28 having an angularly-disposed securing flange 29 extending from its lower terminal, and this flange conforms with and is secured to the upper terminal of the inclined shelf 20 by spot welding or other suitable securing method or means. The lateral terminals of the extension plate 28 are inwardly curled or turned to provide reinforcing flanges 30a.

The handle structure 23 includes three spaced parallel hand grips 27, 27a and 27b, which are located between the securing flange 25 and the downturned extension plate 28. Each hand grip is provided with opposed downwardly and inwardly extending arcuate flanges 30 to thus provide tubular members of circular cross sections (Figures 3 and 4), so that the weight of the container may be supported by the hand without presenting any angular or sharp surfaces to the fingers.

The upper surfaces of the hand grips 27, 27a and 27b are arranged in parallelism in a common plane to thus provide a supporting shelf for reason to be hereinafter set forth.

A vent tube 31 has one terminal secured to and extending through the shelf 20, and its opposed terminal is located within the air trap 15 of the container top. When the closure plug 22 is screwed to closed position, it closes the outer terminal of the vent tube 31, but when this plug is removed, the outer terminal of the tube 31 is open to vent the container to permit its contents to be poured therefrom.

The handle structure 23 is slightly narrower than the width of the container, so that the inner longitudinal side surfaces 32 of the lower bead 12 of the container engage the outer surfaces 33 of the outer handles 27 and 27b (Figures 3 and 4) when the bottom 10 of the container is placed on the upper surfaces of the hand grips 27, 27a and 27b in the containers. In this relationship, the bottom 10 of the upper container is supported against lateral displacement by the upper surfaces of the horizontally-aligned handles 27, 27a and 27b of the lower container, as best seen in Figures 1, 3 and 4. Inasmuch as the length of the handle extends inwardly beyond the axial center of the container, the superposed container is supported in stable equilibrium by the lower container, and, as stated, the containers are held against lateral displacement by the interengagement of the inner side surfaces 32 of the lower terminal bead 12 and the outer surfaces of the handles 27 and 27b.

By providing three handles, two persons may support the container in verticle balanced condition by gripping the side handles 27 and 27b. However, if the container is supported by one person, the intermediate handle 27a is employed, and inasmuch as this handle is centrally located, the container is suspended in balanced vertical position.

By securing one terminal of each hand grip 27, 27a or 27c to the upper portion of the inclined walls 17 and the upper wall 19 of the air chamber 15 and spacing the opposed terminal from the horizontal wall 16, ample space is provided between the upper surface of the wall 16 and the lower surfaces of the handles 27, 27a and 27b to conveniently and comfortably receive the fingers.

By the provision of the disclosed improved handle arrangement, each container may be conveniently supported in balanced vertical position by one or two persons, and the handles also provide a supporting shelf to permit the containers to be stacked in superposed relation, thus saving valuable space in storage depots and shipping terminals.

Having thus described my invention, what is claimed as new and useful is:

1. A container including a top portion having a top wall, an inclined wall, and an inwardly-spaced horizontal wall, a plurality of handles and each having one terminal thereof secured to the top wall and the upper terminal of the inclined wall, the opposed terminal of each handle being supported in spaced relation to the horizontal wall, the upper surfaces of the handles being disposed in a common plane and adapted to support the bottom of a similar container which is disposed in superposed relation upon the said container.

2. A container including a top portion having a lower wall and an upper wall, three handles, each having one terminal secured to the upper wall and its opposed terminal supported in spaced relation above the lower wall, the upper surfaces of the handles being disposed in a common plane and adapted to support the bottom of a second container which is disposed in superposed relation upon the said container.

3. A container having side walls, a bottom and a top portion, a marginal bead extending around and projecting below the bottom, said top portion having a lower wall and an upper wall, three handles, each having one terminal secured to the upper wall and its opposed terminal supported in spaced relation above the lower wall, the upper surfaces of the handles being disposed in a common plane and adapted to support the bottom of a similar container which is stacked in superposed relation upon the said container, the distances between the inner surfaces of opposed portion of the said bead being substantially equal to the distance between the outer surfaces of the outermost handles, whereby the bead of the superposed container fits over the outermost handles of the said container to prevent lateral displacement of the stacked container.

4. A container including a top portion and a bottom portion, said top portion having a lower wall and an upper wall, three handles, each having one terminal secured to the upper wall and its opposed terminal supported in spaced relation above the lower wall, said bottom portion comprising a substantially flat bottom panel and a downwardly extending marginal bead, the upper surfaces of the handles being disposed in a common plane whereby to support the bottom of a second similar container which is disposed in superposed position with the bottom panel resting on said handles above the lower edge of said bead to prevent lateral displacement of the stacked container.

WILLIAM B. JOHNSON.